Feb. 18, 1941.        J. VOTYPKA         2,232,353
CONVERTIBLE BODY
Filed Nov. 19, 1938          5 Sheets-Sheet 5
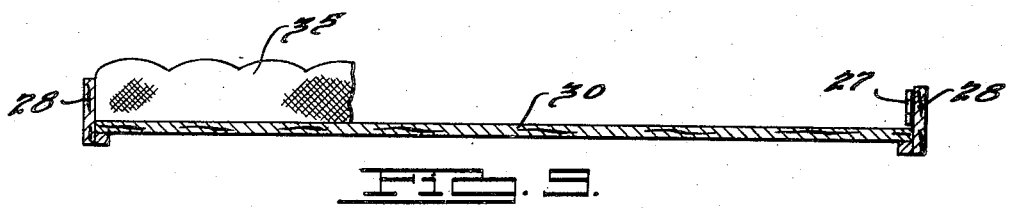
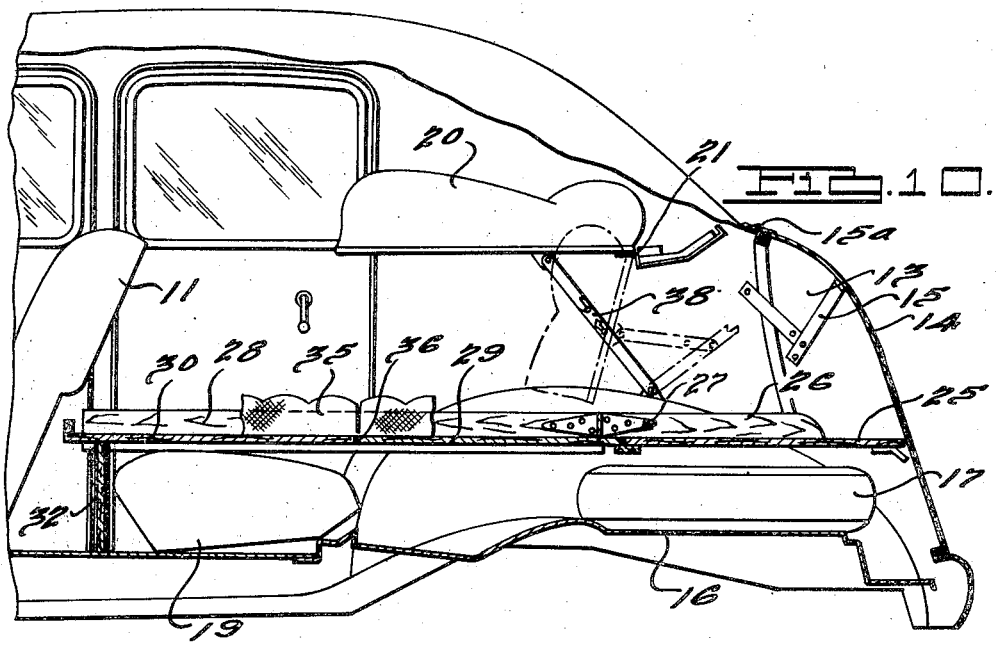
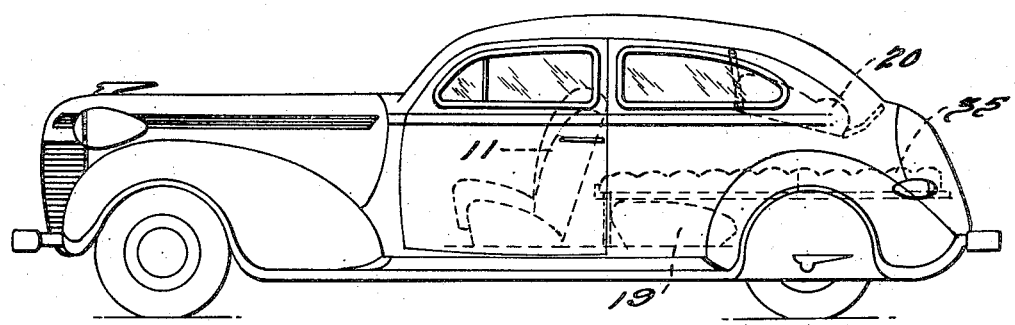
INVENTOR
John Votypka.
BY Dike, Calver & Gray
ATTORNEYS.

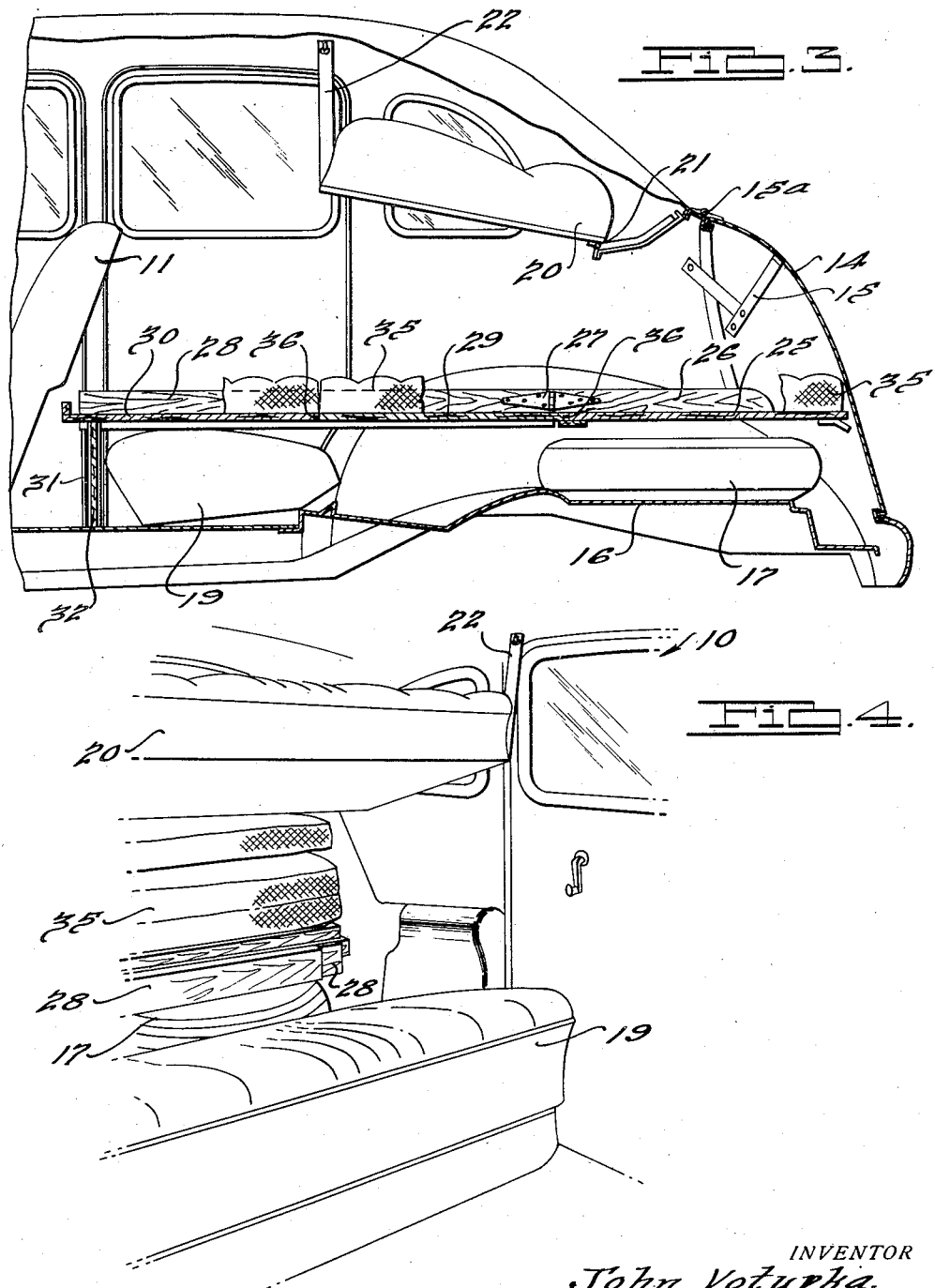

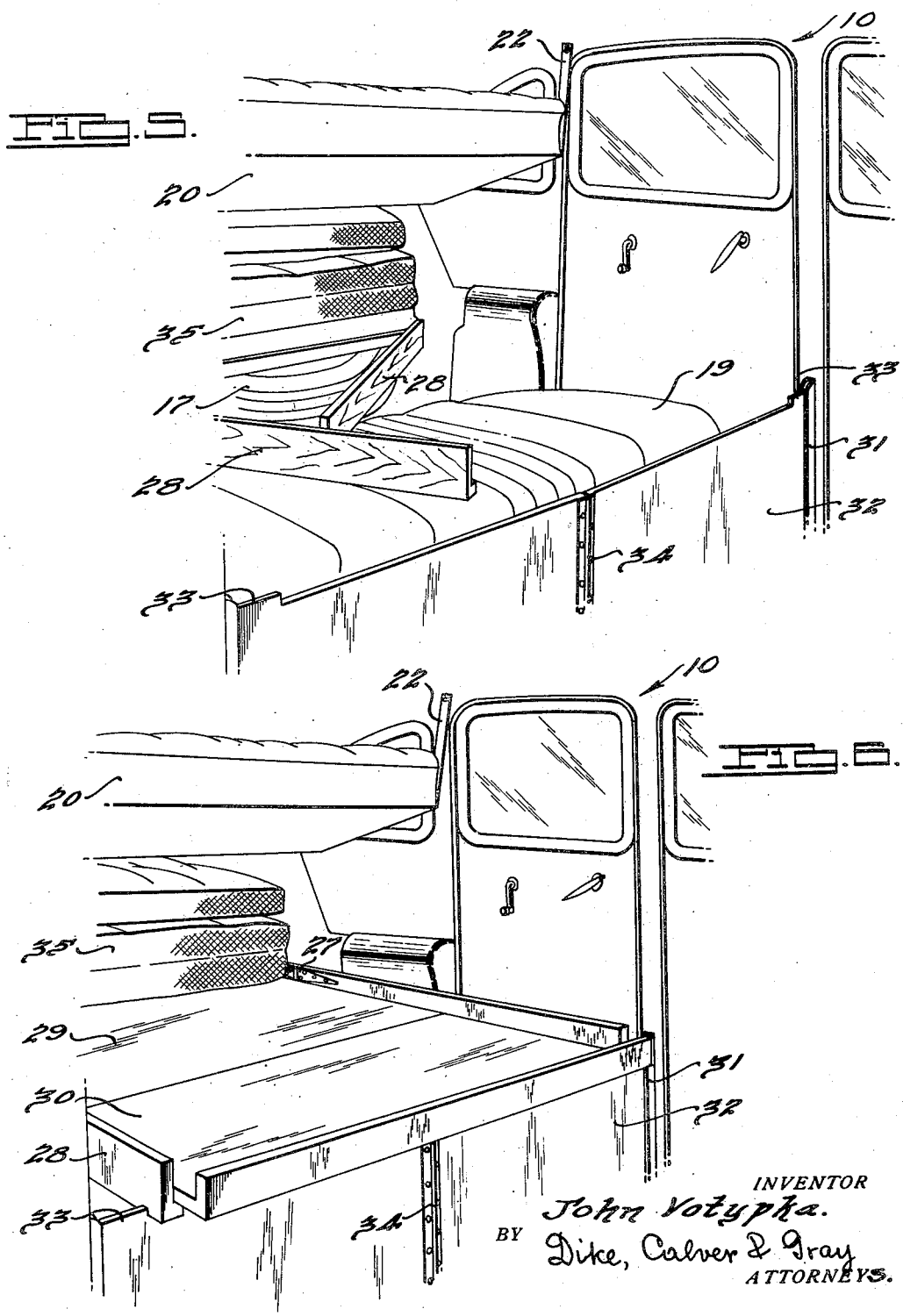

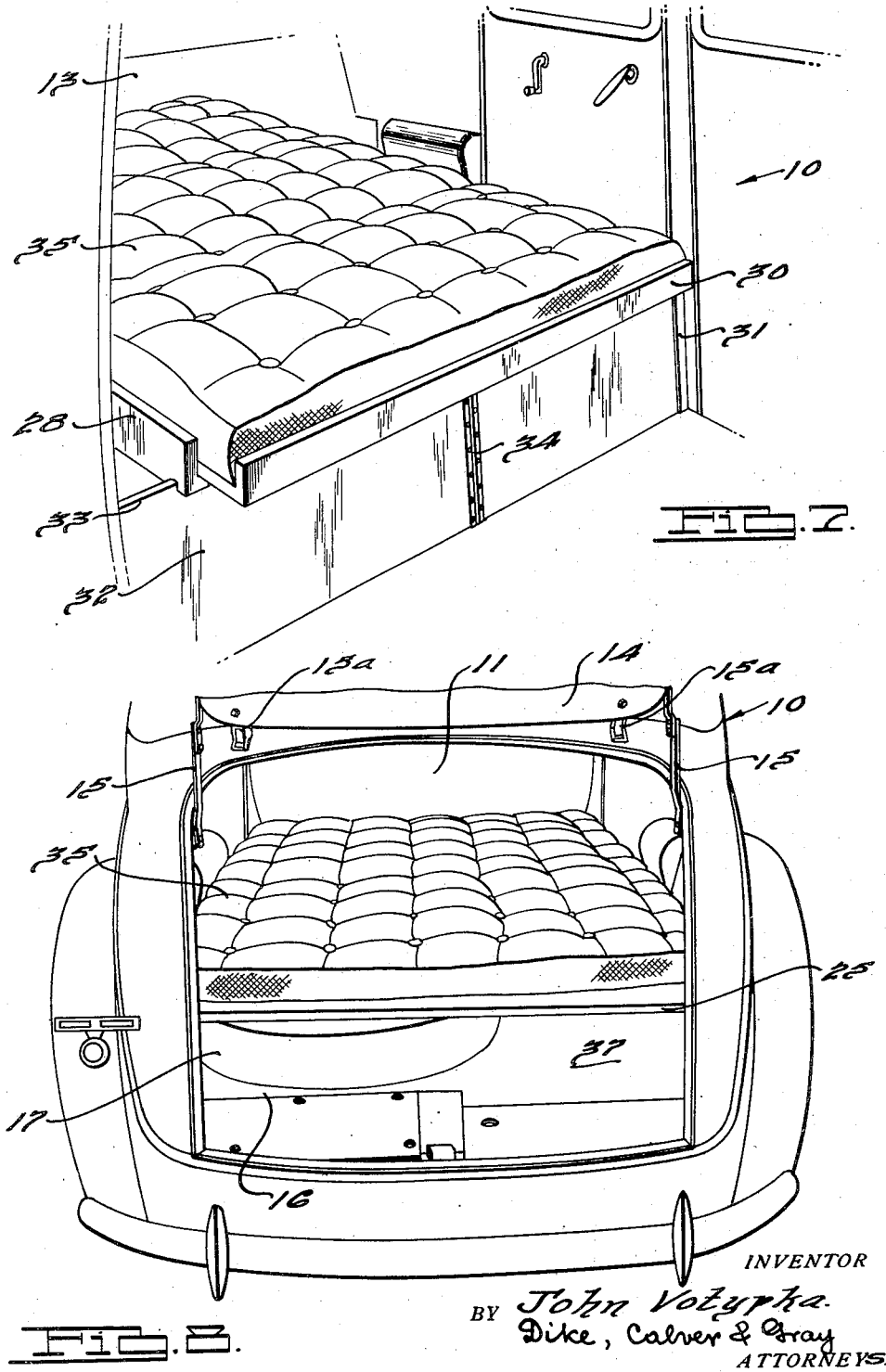

Patented Feb. 18, 1941

2,232,353

UNITED STATES PATENT OFFICE 2,232,353

CONVERTIBLE BODY

John Votypka, Detroit, Mich., assignor to Briggs Manufacturing Company, Detroit, Mich., a corporation of Michigan Application November 19, 1938, Serial No. 241,318

2 Claims. (Cl. 296—24)

This invention relates to motor vehicles and more particularly to motor vehicle bodies.

One of the objects of the present invention is to provide a motor vehicle which can be selectively used as a sedan automobile, as a closed truck, or as a sleeping car.

Another object of the invention is to provide a motor vehicle of the foregoing character in which the improved means, enabling the above uses of the vehicle, are of such a type as not to change the conventional appearance of the vehicle.

A further object of the invention is to provide a motor vehicle having a foldable bed and mattress, both receivable, when folded, in the rear compartment of the vehicle and so arranged therein that there is still enough room for the spare tire and baggage.

It is an added object of the present invention to provide a motor vehicle of the above specified character in which the desired objects are attained with the aid of improved means simple in construction and dependable in operation, and also relatively inexpensive to manufacture.

Other objects of this invention will appear in the following description and appended claims, reference being had to the accompanying drawings forming a part of this specification wherein like reference characters designate corresponding parts in the several views.

Fig. 3 is a view similar in part to Fig. 2, the bed structure being shown in its unfolded or extended position and partly in section.

Fig. 4 is a perspective view taken from the front seat of the car toward the rear thereof, the back rest being shown raised and the platform and the mattress being shown folded. This view may be taken as illustrating the first step in unfolding the bed.

Figure 1:
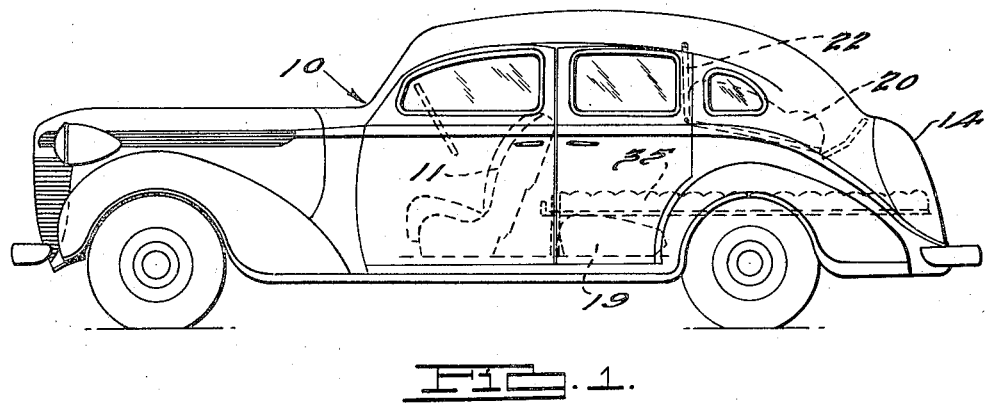
Fig. 1 is a side view of a motor vehicle embodying the present invention, in which the general arrangement of the bed when the same is unfolded, is shown in dotted lines.

Fig. 5 indicates the next step in arranging the bed, namely, unfolding the side members of the platform and installing the board intended for supporting the front part of the platform.

Fig. 6 illustrates the bed structure with the platform fully extended.

Fig. 7 shows the bed completely unfolded, with the mattress being properly arranged on the platform, this view being taken from a point looking from the front seat of the vehicle toward the rear thereof.

Fig. 8 shows the extended bed, the view being taken from the rear of the vehicle.

Fig. 9 is a transverse sectional view through the extended bed structure.

Fig. 10 is a view similar in part to Fig. 3, illustrating a modified structure embodying the present invention.

Fig. 11 illustrates the second modification of the present invention.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings there is shown, by way of example, a motor vehicle having a body of the sedan type in which there is incorporated a bed foldable in the rear compartment of the vehicle and unfoldable from said compartment toward the front of the vehicle.

Referring to the drawings the structure illustrated in Figs. 1 to 9 inclusive, comprises a motor vehicle indicated generally by the numeral 10 having a body of the four door sedan type, including a front seat structure 11 and a rear seat structure generally indicated by the numeral 12. At the rear of the vehicle there is provided a compartment 13 normally covered with a raisable lid 14 provided with suitable check arms 15 and hingedly connected to the body structure as indicated at 15a. The bottom 16 of the rear compartment 13 is adapted to receive a spare tire 17 which is arranged flat on said bottom and secured thereto in any suitable manner to prevent undesirable movements thereof in operation of the vehicle.

The rear seat 12 comprises a cushion 19 arranged on the floor of the vehicle and adapted to rest firmly thereon, and a cushioned back rest 20. The back rest 20 serves as a partition between the passenger compartment of the vehicle and the rear compartment 13. Said back rest 20 is hingedly secured at its top to the vehicle structure as indicated at 21, while its lower edge rests against a suitable support (not shown). The lower part of the back rest is raisable to bring the back rest into a substantially horizontal position by rotating the entire back rest around the hinge 21. The straps 22 are adapted to support the back rest in such horizontal position. The straps 22 may be carried either by the back rest, in which case the upper ends are provided with eyelets for the passage of hooks secured near the ceiling of the vehicle, or conventional hand straps or assist cords usually provided in bodies for the convenience of occupants of the rear seat may be utilized for the above purpose by providing eyelets in their lower ends and securing hooks to the lower corners of the back rest. When the back rest is raised, as shown in Figs. 1, 3, 4, 5 and 6, there becomes available in the vehicle a relatively long space between the rear compartment lid 14 and the front seat 11. This space is quite sufficient for arranging therein a bed capable of accommodating an occupant of any reasonable height.

In accordance with the invention there is provided a collapsible bed structure foldable into the rear compartment 13 and adapted to extend, when unfolded, from the said compartment of the vehicle toward the front seat 11.

Referring to the drawings and particularly to Fig. 3, wherein the bed structure is shown unfolded, the same comprises a board or platform section 25 fixed in any suitable manner in the rear compartment 13 immediately above the spare tire 17. Along the sides of the fixed section 25 there are provided two members or narrow boards 26 rigidly secured to the fixed section 25. To the front end of said boards 26 there are hingedly connected, as shown at 27, two angle members 28. The hinges 27 connecting the boards 26 and said members 28 are arranged on the inner side thereof, see Fig. 6, and therefore said members may be folded inwardly of the vehicle along the front edge of the fixed section 25, see Figs. 5 and 4.

When the angle members 28 are unfolded, they can receive an intermediate board or platform section 29 and an end board or platform section 30, see Figs. 3 and 6. At the sides of the body between the doors there are provided two vertically extending channel members 31 secured to the door posts, see Figs. 2, 5 and 6, and adapted to receive a front board 32 serving as a support for the front end of the bed platform formed by the above described sections when the same are properly assembled. The front board 32 is relieved to provide shoulders 33 in order to receive the angle members 28 and to prevent undesirable side swaying thereof which might imperil the hinge connections 27. The front board consists of two sections connected by means of a long hinge 34 provided on the front side of the board. By virtue of such a construction the front board 32 is foldable only in a rearward direction and if supported in said direction, it becomes substantially rigid. Such a support is provided by means of the rear cushion 19 which may be moved toward the front of the vehicle and arranged on the floor immediately behind the front board 32.

From an examination of Fig. 6 it will be seen that when the platform is assembled as described above, the side angle members 28 are supported in vertical directions by the front board 32 and they, in turn, support the sections 29 and 30. At the same time said sections 29 and 30 prevent inward movements of the angle members 28, while the outward movements of said angle members is prevented by the shoulders 33. The front board 32 being supported in the channels 31 in front of the cushion 19 also provides a substantially rigid support for the front end of the platform. In addition, undesirable folding of the front board is prevented by the snug fitting of the platform into the recess between the shoulders 33, since a movement of the middle of the front board 32 toward the rear would tend to decrease the size of the relief which, of course, would be resisted by the end section 30. Thus, a platform substantially rigid in all directions is provided, which platform is adapted to receive a mattress 35. The tongue and groove connections 36 between the platform sections also contribute to the rigidity of the structure. When the mattress 35 is unfolded, as shown in Figs. 7 and 8, a full size bed is formed in the vehicle, which can be utilized to advantage by the occupants thereof. It is preferable to sleep with the head toward the front seat, since such position of the occupant of the bed gives him the benefit of better ventilation and avoids having the suspended back rest too close to an occupant's face, which would be somewhat unpleasant.

The rear cushion 19 may be left in its place and it will not interfere with the position of the platform. It should be understood in this connection that although the top portion of the cushion 19 appears in Fig. 2 to be disposed above the plane of the fixed section 25, this in no way interferes with the extension of the platform, since the soft cushion is compressed by the pressure of the platform and the weight of occupant. In some cases the rear of the cushion may rise because of the pressure of the platform on the front of the cushion which arranges itself still better under the platform. The back rest 20 is, of course, raised as shown in Fig. 3. If desired, the hinge 21 of the back rest may be made collapsible in order to permit removal of the back rest for arranging it between the cushion 19 and the front board 32 in the case of a larger body such as a seven passenger sedan. With the back rest 20 being removed and safely arranged on the floor, the bed may be occupied by some of the occupants while the rest of them may occupy the front seat and drive at night.

It will also be noted that the spare tire 17 is arranged closer to one side of the vehicle thereby giving additional baggage space 37 (see Fig. 8) under the fixed section 25.

Figure 2:
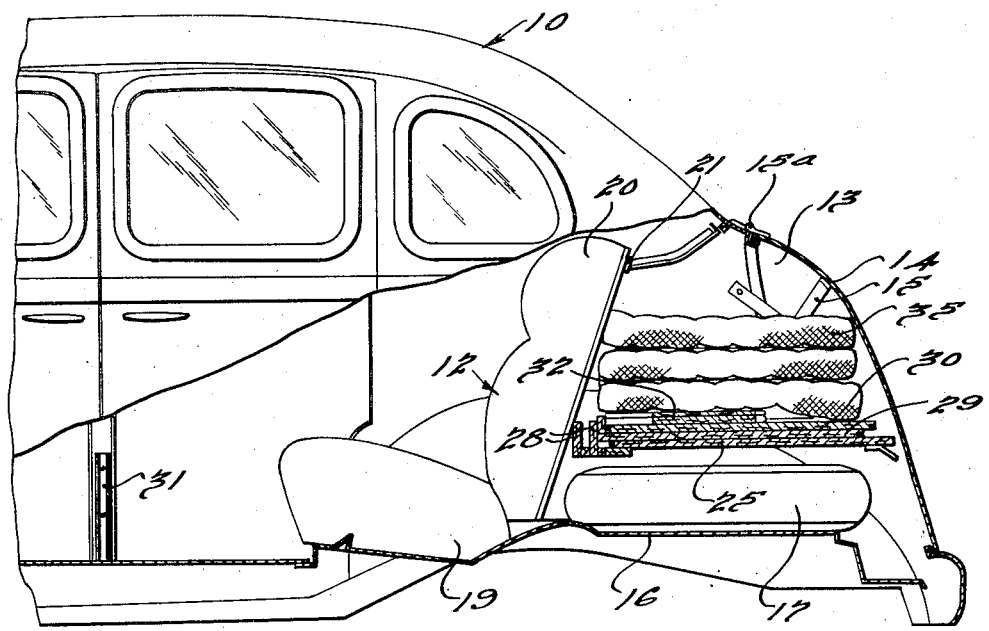
Fig. 2 shows, partly in section, the rear part of the vehicle illustrated in Fig. 1, the bed being shown folded in the rear compartment of the vehicle above the spare tire.

The bed structure of the above described embodiment can easily be folded into the rear compartment in the following manner: The mattress is first folded into the rear compartment over the fixed section 25, whereupon the sections 30 and 29 are removed and slipped under the mattress and the angle members are folded along the front edge of the fixed section 25. The front board 32 is next removed from the channels 31 by moving it upwardly, folded and also slipped under the mattress. The straps supporting the back rest 20 in the horizontal position are unfastened and the back rest is lowered onto the cushion 19. When folded, as above described, the structure will present a view as illustrated by Fig. 2. From an examination of said Fig. 2 it can be seen that there is still available in the rear compartment 13 some room above the mattress for additional baggage.

Fig. 10 illustrates a modified construction in which the back rest is supported in a horizontal position by means of a check arm 38, which locks and unlocks itself automatically. In said figure the positions of the parts of said check arm when the back rest is lowered are indicated in dotted lines.

The above described bed construction may be used in sedan cars of four door as well as of two door type. Fig. 11 illustrates a sedan body of the two door type with the bed construction embodying the present invention being arranged therein.

An additional advantage of the present invention consists in the possibility of using a vehicle constructed in accordance with the present invention as a closed truck. To adapt the vehicle for such a use it is only necessary to remove the mattress and the loose sections from the rear compartment and to raise the back rest. When so adapted the vehicle may be used for the transportation of long articles, such for instance as ladders, boards, etc., which cannot be transported in a conventional sedan car without endangering the windows thereof, scraping the window frames and damaging the upholstery. It should be noted that in the transportation of such articles the rear compartment lid 14 may be opened, if necessary, to permit the extension of such articles rearwardly of the vehicle for a considerable distance.

Thus, considered from one of its broader aspects my invention contemplates providing a motor vehicle body with a platform foldable into the upper portion of the rear compartment of the vehicle, which platform, when unfolded, bridges over the seat cushion and is supported outside of the rear compartment only in one place, the platform parts being of such a construction as to interlock with one another and to form a rigid structure without the use of pins, bolts, an excessive number of hinges, and the like.

I claim:

1. In a motor vehicle having a body of the closed type with a rear compartment in said body and having door posts at its sides, a rear seat structure including a seat cushion and a back rest, said back rest being hingedly secured at its top to the body structure with its bottom being raisable to bring said rest into a substantially horizontal position and supported thereat, a rigid platform and a soft mattress foldable into said rear compartment, said platform comprising a plurality of boards, one of said boards being fixed within said rear compartment, two angle side members hingedly secured to the front corners of said fixed board and foldable inwardly of the vehicle along the front edge of said fixed board, said side members being adapted to extend when unfolded over and beyond said seat cushion, two vertically extending channel members secured to the door posts, a front board having ends adapted to be inserted into said channel members and supported thereby in a vertical position transversely of the vehicle for supporting said side members, thereby enabling unfolding the platform in the plane of said fixed board but entirely over said seat cushion.

2. In a motor vehicle having a body of the closed type with a rear compartment in said body and having door posts at its sides, a rear seat structure including a seat cushion and a back rest, said back rest being hingedly secured at its top to the body structure with its bottom being raisable to bring said rest into a substantially horizontal position and supported thereat, a rigid platform and a soft mattress foldable into said rear compartment, said platform comprising a plurality of boards, one of said boards being fixed within said rear compartment, two angle side members hingedly secured to the front corners of said fixed board and foldable inwardly of the vehicle along the front edge of said fixed board, said side members being adapted to extend, when unfolded, over and beyond said seat cushion, two vertically extending channel members secured to the door posts, a front board foldable at its middle and having ends adapted to be inserted into said channel members for supporting said front board in a vertical position in front of said seat cushion and transversely of the vehicle, said front board being recessed at its top to receive said side members and to serve as a stop to downward and side movements thereof, said side members being adapted to receive the remaining platform boards, said boards being supported by said side members and at the same time preventing inward movements thereof, whereby the platform may be unfolded bridging over said seat cushion.

JOHN VOTYPKA.